United States Patent
Rodgers et al.

(10) Patent No.: US 11,421,789 B2
(45) Date of Patent: Aug. 23, 2022

(54) DOUBLE SCREEN FILTER FOR VALVE

(71) Applicants: Ian Rodgers, Elgin, IL (US); Tony Leeseberg, Elgin, IL (US); James E. Pearson, Downers Grove, IL (US)

(72) Inventors: Ian Rodgers, Elgin, IL (US); Tony Leeseberg, Elgin, IL (US); James E. Pearson, Downers Grove, IL (US)

(73) Assignee: Robertshaw Controls Company, Itasca, IL (US)

( * ) Notice: Subject to any disclaimer, the term of this patent is extended or adjusted under 35 U.S.C. 154(b) by 375 days.

(21) Appl. No.: 16/704,956

(22) Filed: Dec. 5, 2019

(65) Prior Publication Data

US 2021/0172533 A1     Jun. 10, 2021

(51) Int. Cl.
| F16K 31/00 | (2006.01) |
| F16K 1/42 | (2006.01) |
| B01D 46/42 | (2006.01) |
| B01D 46/10 | (2006.01) |
| B01D 46/62 | (2022.01) |

(52) U.S. Cl.
CPC ............... *F16K 1/42* (2013.01); *B01D 46/10* (2013.01); *B01D 46/4272* (2013.01); *B01D 46/62* (2022.01); *F16K 31/002* (2013.01); *Y10T 137/7976* (2015.04)

(58) Field of Classification Search
CPC ..... B01D 46/62; F16K 31/002; F16K 31/006; Y10T 137/7979; Y10T 137/8122; Y10T 137/86847; Y10T 137/87772
USPC ........................ 210/429, 431; 251/11, 129.06
See application file for complete search history.

(56) References Cited

U.S. PATENT DOCUMENTS

| 1,303,529 | A | * | 5/1919 | York | F02M 21/00 48/189.3 |
| 4,113,627 | A | * | 9/1978 | Leason | B29C 45/1671 264/DIG. 48 |
| 4,512,771 | A | * | 4/1985 | Norton | A61F 5/44 55/482 |
| 4,685,652 | A | * | 8/1987 | Shopsky | F16K 31/002 137/550 |
| 4,955,583 | A | * | 9/1990 | Shopsky | F16K 31/002 137/550 |
| 5,353,828 | A | * | 10/1994 | Troscinski | F16K 31/002 60/528 |
| 5,766,469 | A | * | 6/1998 | Boast | B29C 45/14467 137/550 |

* cited by examiner

*Primary Examiner* — Robert K Arundale
(74) *Attorney, Agent, or Firm* — Reinhart Boerner Van Deuren P.C.

(57) ABSTRACT

Embodiments of a valve having a housing including an inlet, an outlet, and an interior chamber in fluid communication with the inlet and the outlet are disclosed. The valve also includes a seat fitting having a first screen held in place by a first retainer ring. The seat fitting includes a valve seat. The valve further includes an outlet fitting having a second screen held in place by a second retainer ring. The second retainer ring includes a plurality of ribs extending from a ring body such that the plurality of ribs create a gap between the ring body and the second screen. Further, the valve includes a valve plug configured to selectively engage the valve seat to open and close a passage between the interior chamber and the outlet. The seat fitting is contained at least partially within the outlet fitting to define the outlet of the housing.

21 Claims, 5 Drawing Sheets

DOUBLE SCREEN FILTER FOR VALVE

FIELD OF THE INVENTION

This invention generally relates to gas valves and more particularly to gas valves for heating applications.

BACKGROUND OF THE INVENTION

In order for a valve to function properly, the valve must be able to create an adequate seal when it is desired to block flow. Depending on the type of valve, the seal can be created in a variety of ways. In one particular type of valve, a seal is created between a (generally) elastomeric valve plug and a valve seat. In certain circumstances, debris may become deposited between the valve plug and the valve seat, preventing the valve from creating an adequate seal.

For particular gas valves, the valve plug may become clogged with debris based on the way in which the gas valve is assembled. For example, the outlet of the gas valve may act as the seat for the valve plug, and during assembly, the outlet may be threaded into the housing, which can create metal shavings. The metal shavings can then become lodged in the valve plug, preventing the creation of a seal between the seat and valve plug.

Attempts to prevent debris from entering the valve have been made. In particular, a single mesh has been used to block at least some of the debris from entering the valve and lodging in the valve plug. However, the mesh size is restricted because too small of a mesh size leads to an undesirable pressure drop across the mesh. Thus, the mesh size must be large enough to allow adequate fluid flow through the valve, but the relatively large size still allows an undesirable amount of debris to pass through the mesh and lodge in the valve plug Applicants have recognized a need in the art for a valve that does not experience these issues associated with debris obstruction of a valve seal in a gas valve. Embodiments of the presently disclosed invention provides an outlet for a gas valve that prevents or substantially diminishes deposition of debris between the valve plug and seat. These and other advantages of the invention, as well as additional inventive features, will be apparent from the description of the invention provided herein.

BRIEF SUMMARY OF THE INVENTION

Various embodiments of a gas valve having a dual-screen outlet are disclosed herein. The gas valve is usable in a variety of applications, including in fireplaces, cooking appliances, and HVAC equipment, among others. As will be described more fully below, the outlet of the gas valve includes a first screen in an outlet fitting and a second screen in a seat fitting. The screen of the outlet fitting has a larger mesh size that the screen of the seat fitting. In this way, the larger mesh screen prevents large debris from entering the outlet, and the smaller mesh screen prevents small debris from disrupting a seal between a valve plug and the seat fitting. The larger mesh screen is secured in the outlet fitting using a retainer ring including ribs that decrease the surface area of the retainer ring in contact with the screen. In combination with the retainer ring having ribs, the use of the different mesh sizes allows for the trapping of both the large and small debris without creating an undesirably large pressure drop across the outlet. Additionally, the retainer rings that secure the screens are held in place within the fittings using welds that do not create debris during installation (e.g., like might be created using threaded attachment). These and other aspects and advantages will be discussed in relation to the exemplary embodiments provided below and in the figures. However, these embodiments should be viewed as illustrative and not limiting in nature.

As will be described in more detail below, embodiments of the present disclosure are directed to a valve having a housing including an inlet, an outlet, and an interior chamber in fluid communication with the inlet and the outlet. The valve also includes a seat fitting having a first screen held in place by a first retainer ring. The seat fitting includes a valve seat. The valve further includes an outlet fitting having a second screen held in place by a second retainer ring. The second retainer ring includes a plurality of ribs extending from a ring body such that the plurality of ribs create a gap between the ring body and the second screen. Further, the valve includes a valve plug configured to selectively engage the valve seat to open and close a passage between the interior chamber and the outlet. The seat fitting is contained at least partially within the outlet fitting to define the outlet of the housing.

In embodiments of the valve, the first screen comprises a first mesh size and the second screen comprises a second mesh size. The first mesh size is smaller than the second mesh size. For example, in embodiments, the first mesh size is from 80×80 to 100×100, and the second mesh size is from 80×80 to 100×100.

In embodiments, when gas flows between the inlet and outlet, a pressure drop across the outlet is no more than 10%.

Further, in embodiments, the first retainer ring is welded to the seat fitting, and in additionally, in embodiments, the second retainer ring is welded to the outlet fitting. In a particular embodiment, at least one of the first retainer ring or the second retainer ring is spin-welded to the seat fitting or the outlet fitting, respectively.

In certain embodiments, the gap between the ring body and the second screen is at least 0.035 inches.

Additionally, in embodiments, the plurality of ribs is from two to six ribs. In certain examples of such embodiments, the second retainer ring comprises a first end, a second end, and a tapered outer surface. The tapered outer surface is defined by a decreasing diameter of the second retainer ring going from the first end to the second end. The plurality of ribs extends from the second end of the second retainer ring.

In embodiments, the valve plug is carried on a lever arm that comprises a section of a bimetallic lever wrapped in a heater wire. When current runs through the heater wire, the bimetallic lever causes the lever arm to pull the valve plug away from the valve seat.

In embodiments, the valve includes a further outlet in fluid communication with the interior chamber. The further outlet is defined by a further seat fitting contained at least partially in a further outlet fitting. The further seat fitting comprises a third screen held in place by a third retainer ring, and the further seat fitting includes a further valve seat. The further outlet fitting includes a fourth screen held in place by a fourth retainer ring. The fourth retainer ring includes a plurality of ribs extending from a ring body such that the plurality of ribs create a gap between the ring body and the fourth screen. A further valve plug is configured to selectively engage the further valve seat to open and close a passage between the interior chamber and the further outlet. In such embodiments, the outlet and the further outlet may be arranged on opposite sides of the housing.

Embodiments of the present disclosure are also directed to an outlet port for a gas valve. The outlet port includes a seat fitting including a first screen held in place by a first retainer ring. The seat fitting includes a valve seat configured to engage a valve plug. The outlet port also includes an outlet fitting including a second screen held in place by a second retainer ring. The second retainer ring includes a plurality of ribs extending from a ring body such that the plurality of ribs create a gap between the ring body and the second screen. The seat fitting is contained at least partially within and is coaxial with the outlet fitting to define the outlet port. The first screen has a first mesh size, and the second screen has a second mesh size. The first mesh size is smaller than the second mesh size.

In embodiments of the outlet port, the first mesh size is from 80×80 to 100×100 and, the second mesh size is from 80×80 to 100×100. Further, in embodiments, the first retainer ring is welded to the seat fitting and wherein the second retainer ring is welded to the outlet fitting. Additionally, in embodiments, the first retainer ring comprises a first end, a second end and a tapered outer surface. The tapered outer surface is defined by a decreasing diameter of the first retainer ring going from the first end to the second end. In other embodiments, the second retainer ring comprises a first end, a second end, and a tapered outer surface. The tapered outer surface is defined by a decreasing diameter of the second retainer ring going from the first end to the second end. Further, a plurality of ribs extend from the second end of the second retainer ring to hold the second screen in place. For example, the plurality of ribs is from two to six ribs.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In combination with the figures, exemplary embodiments of a gas valve having a dual-screen outlet are described herein, and various aspects and advantages will be discussed in relation to these exemplary embodiments. However, these exemplary embodiments should be viewed as illustrative and not limiting in nature.

Figure 1:
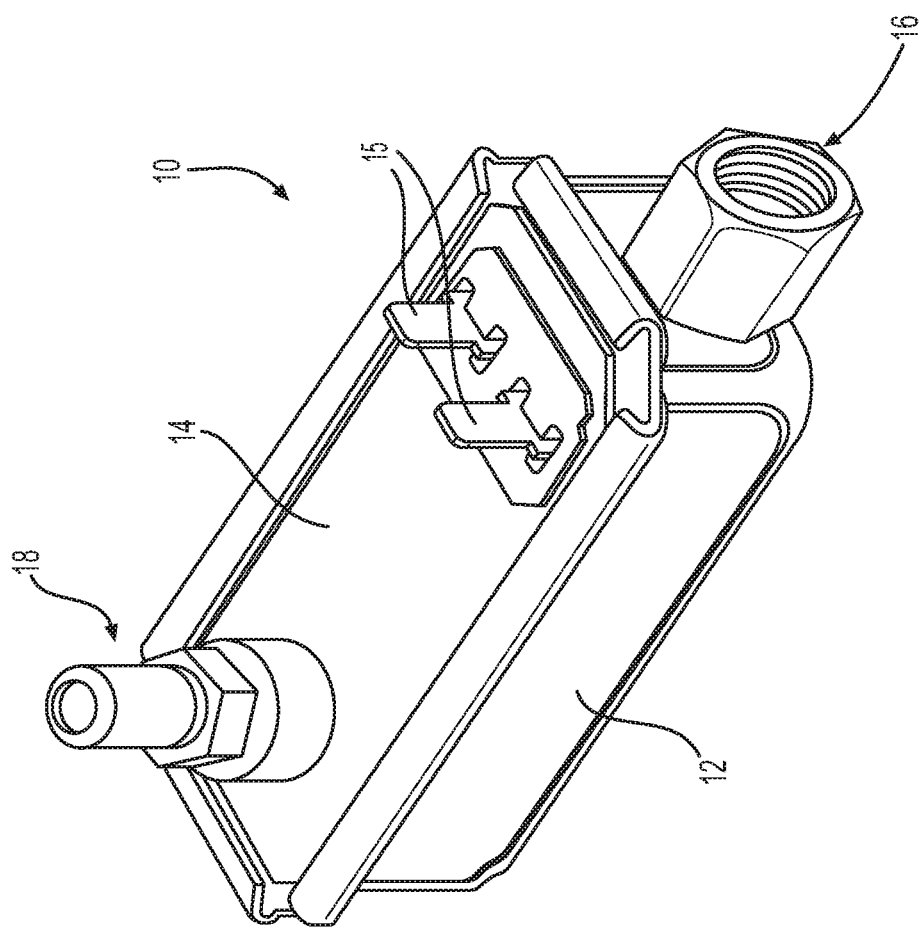
FIG. 1 is a perspective view of a gas valve, according to an exemplary embodiment.

FIG. 1 depicts an embodiment of a gas valve 10 including a housing 12 having a cover 14. The housing 12 is provided with an inlet 16 in fluid communication with an outlet 18 through the cover 14. As will be discussed more fully below, electrical leads 19 extend through the cover 14 to actuate fluid flow through the gas valve 10 from the inlet 16 to the outlet 18.

Figure 2:
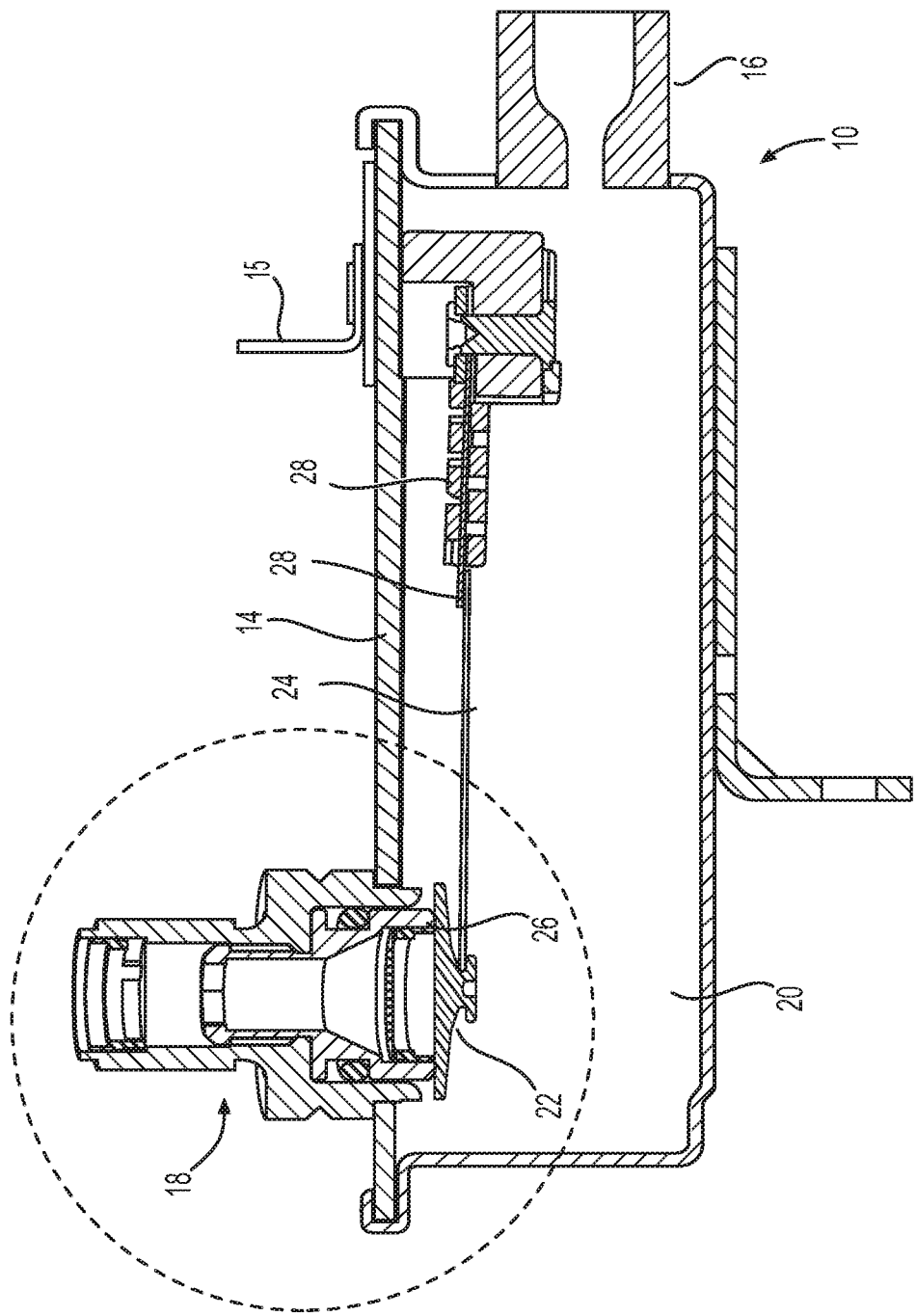
FIG. 2 is a cross-sectional view of the gas valve of FIG. 1, according to an exemplary embodiment.

FIG. 2 provides a cross-sectional view of the gas valve 10. The outlet 18 is in fluid communication with an interior chamber 20 of the gas valve 10. Flow from the interior chamber 20 through the outlet 18 is controlled by a valve plug 22 at the end of a lever arm 24. The valve plug 22 engages a valve seat 26 to prevent flow through the outlet 18. In an embodiment, the lever arm 24 is connected to a bimetallic lever 27 around which is wrapped a heater wire 28. The heater wire 28 is connected to the electrical leads 19, which in turn are connected to and receive signals from a controller (not shown). When current flows through the heater wire 28, the bimetallic lever 27 heats up and bends, which causes the lever arm 24 to disengage the valve plug from the valve seat 26. When current no longer flows through the heater wire 28, the bimetallic lever 27 cools and returns the lever arm 24 to its quiescent position with the valve plug 22 engaging the valve seat 26.

As discussed above and with respect to conventional gas valves, debris (typically from the installation process) can accumulate on the valve plug causing an incomplete seal between the valve plug and the valve seat. With reference to detail view in FIG. 3, the presently disclosed gas valve 10 prevents debris from accumulating in the valve plug 22 through the use of a first screen 30 and a second screen 31 positioned in the outlet 18. In particular, the outlet 18 includes a seat fitting 32 containing the first screen 30 and an outlet fitting 34 containing the second screen 31. In embodiments, the seat fitting 32 and the outlet fitting 34 are both made of metallic materials. For example, the seat fitting 32 is made of aluminum in embodiments, and the outlet fitting 34 is made of plated steel.

The seat fitting 32 is coaxial with and substantially contained inside the outlet fitting 34. The seat fitting 32 has a first cylindrical section 36 and a second cylindrical section 38, and the outlet fitting 34 contains a third cylindrical section 40 and a fourth cylindrical section 42. An abutment surface 44 is contained on the interior of the outlet fitting 34 within the third cylindrical section 40. In embodiments, the abutment surface 44 defines a plane that is substantially perpendicular to a longitudinal axis a extending through the third cylindrical section 40 and the fourth cylindrical section 42. The first cylindrical section 36 of the seat fitting 32 has a first outer surface 46 located between the first cylindrical section 36 and the second cylindrical section 38. In embodiments, the first outer surface 46 defines a plane that is substantially perpendicular to the longitudinal axis a that also extends through the first cylindrical section 36 and the second cylindrical section 38. The first outer surface 46 abuts the interior abutment surface 44 of the outlet fitting 34 such that the second cylindrical section 38 is inserted (at least partially) into the fourth cylindrical section 42. In embodiments, the second cylindrical section 38 is threaded into the fourth cylindrical section 42 to secure the seat fitting 32 to the outlet fitting 34.

The first cylindrical section 36 of the seat fitting 32 also includes a circumferential groove 48 into which a gasket 50 is seated. The gasket 50 creates a seal with an interior surface 52 of the third cylindrical section 40 of the outlet fitting 34.

Having described the general structure of the seat fitting 32 and the outlet fitting 34, the placement of the screens 30, 31 will now be discussed. As mentioned above, the seat fitting 32 contains the first screen 30. In particular, the first screen 30 is provided proximate to the valve seat 26. A first circumferential ledge 54 is provided on the interior of the first cylindrical section 36. The first screen 30 abuts the first circumferential ledge 54 and is held in place with a first retainer ring 56. In an embodiment, the first retainer ring 56 has a tapered outer surface 58 that decreases in diameter going from a first end proximal to the valve seat 26 to a second end distal from the valve seat 26. The tapered outer surface 58 facilitates assembly and allows for the first retainer ring 56 to be press fit into the seat fitting 32. Further, in an embodiment, the first retainer ring 56 has a first interior ledge 60 that allows for a tool to be used for insertion of the first retainer ring 56 to a desired depth. In embodiments, the first retainer ring 56 is spin-welded into the first cylindrical section 36 of the seat fitting 32.

The second screen 31 is positioned at an outlet end 62 of the fourth cylindrical section 42 of the outlet fitting 34. A second circumferential ledge 64 is provided on the interior of the fourth cylindrical section 42. The second screen 31 abuts the second circumferential ledge 64 and is held in place with a second retainer ring 66. In an embodiment, the second retainer ring 66 has a ring body 67 defined by a tapered outer surface 68 that decreases in diameter going from a first end proximal to the outlet end 62 to a second end distal from outlet end 62. As with the first retainer ring 56, the tapered outer surface 68 of the second retainer ring 66 facilitates assembly and allows for the second retainer ring 66 to be press fit into the outlet fitting 34. Further, in an embodiment, the second retainer ring 66 has a second interior ledge 70 that allows for a tool to be used for insertion of the second retainer ring 66 to a desired depth. At the second end of the second retainer ring 66, a plurality of ribs 72 extend from the ring body 67. The second screen 31 is secured between the second circumferential ledge 70 and the ribs 72 of the second retainer ring 66. In this way, the plurality of ribs 72 create a gap 74 between the ring body 67 and the second screen 31. In embodiments, the gap 74 is at least 0.035 inches. In embodiments, the gap 74 may be up to 0.200 inches As will be discussed below, this gap 74 created by the plurality of ribs 72 between the ring body 67 and the second screen 31 prevents an undesirable pressure drop from developing in the outlet 18. In embodiments, the second retainer ring 66 is spin-welded into the fourth cylindrical section 42 of the outlet fitting 34.

As mentioned, the first retainer ring 56 and the second retainer ring 66 are welded, particularly spin-welded, to the seat fitting 32 and the outlet fitting 34, respectively. Advantageously, welding the retainer rings 56, 66 to their respective fittings 32, 34 avoids the creation of metal shavings and other debris when the retainer rings 56, 66 are attached to the fittings 32, 34.

The first screen 30 at the valve seat 26 has a first mesh size, and the second screen 31 at the outlet end 62 has a second mesh size. The first mesh size is smaller than the second mesh size. In embodiments, the first mesh size is from 80×80 to 100×100 (i.e., having mesh openings of 0.0070 inches to 0.0059 inches). In embodiments, the second mesh size is from 80×80 to 100×100 (i.e., having mesh openings of 0.0070 inches to 0.0059 inches). Further, in embodiments, at least one of the first screen 30 or the second screen 31 is a metal wire mesh. In other embodiments, one or both of the screens 28, 30 may be made of another material, such as plastic. The second screen 31 is configured to catch relatively large debris that enters the outlet end 62 of the outlet fitting 34. Relatively small debris that makes its way through the second screen 31 is caught by the first screen 30 at the valve seat 26. In this way, a variety of debris sizes are prevented from entered the interior chamber 20 of the gas valve 10.

Figure 3:
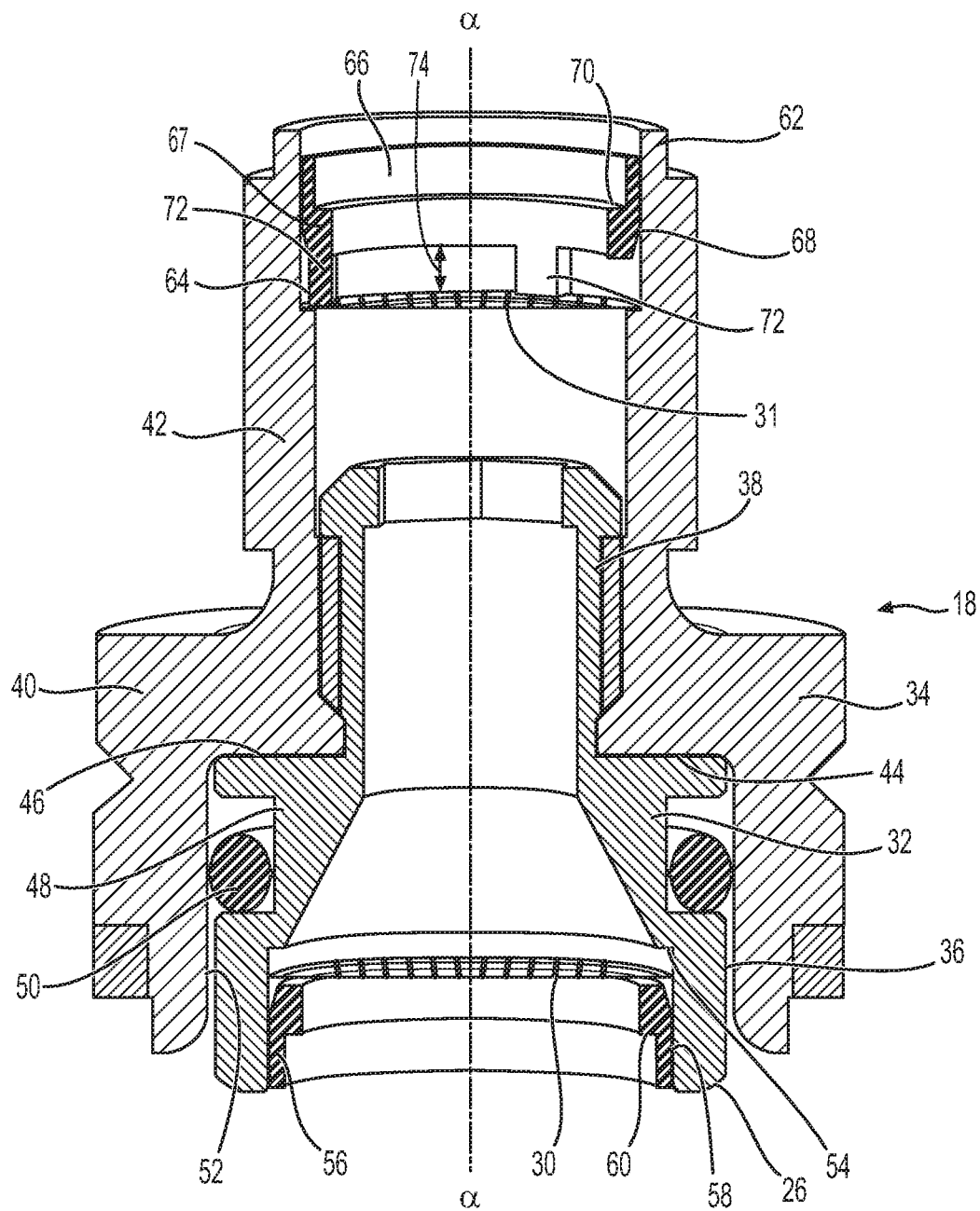
FIG. 3 is a close-up, cross-sectional view of the outlet port of the gas valve, according to an exemplary embodiment.
Figure 4:
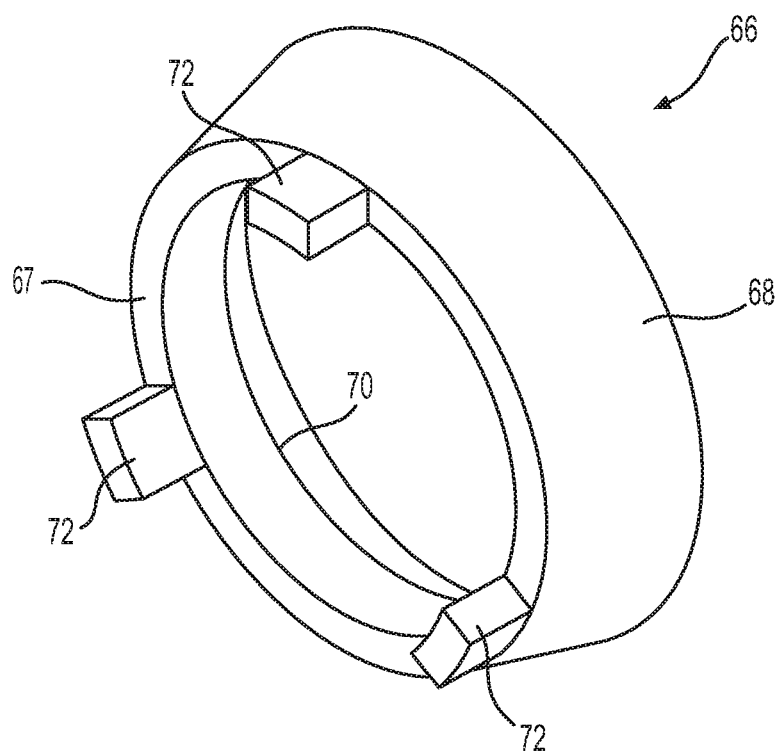
FIG. 4 is a perspective view of the second retainer ring, according to an exemplary embodiment.
Figure 5:
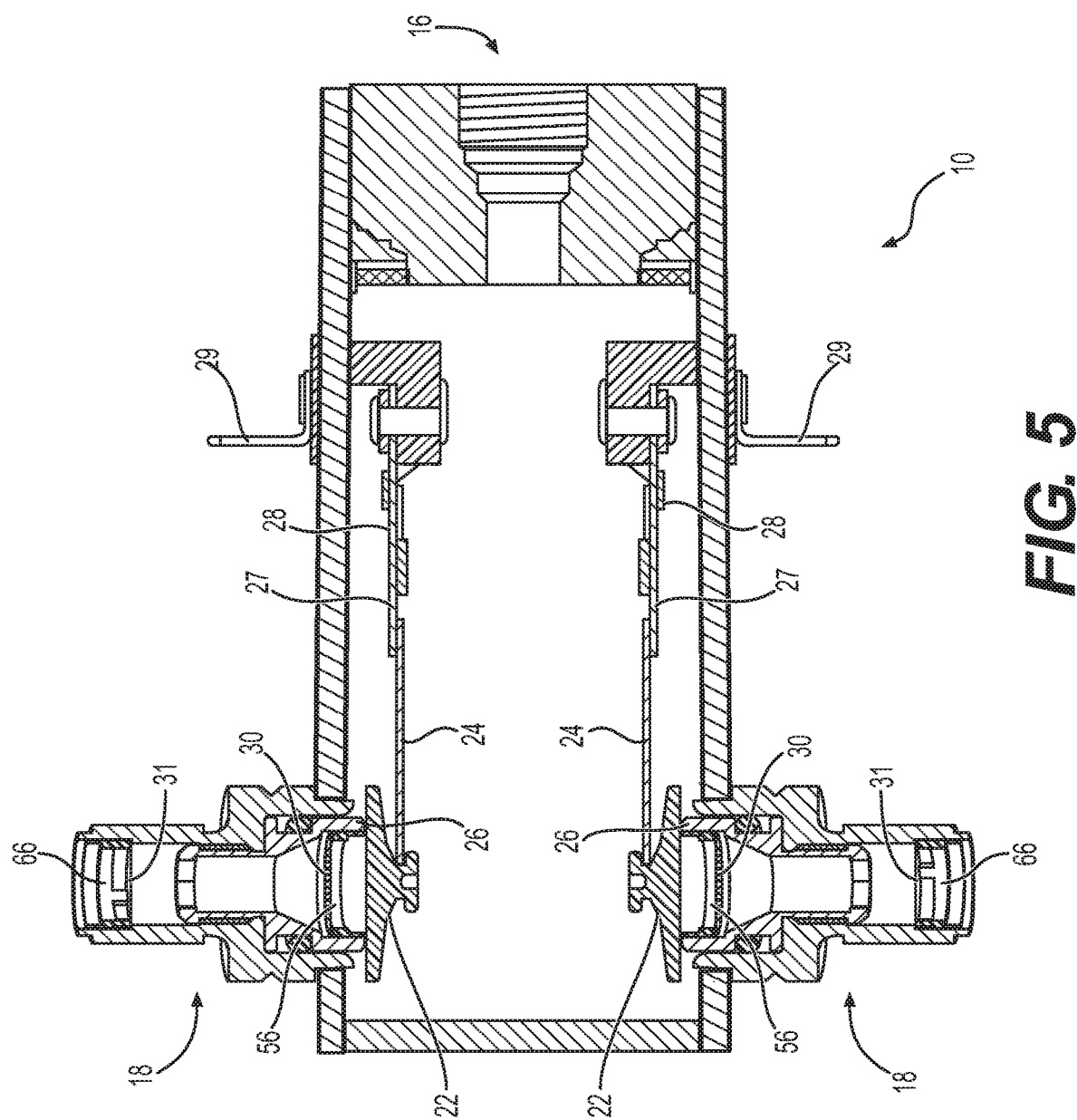
FIG. 5 is another embodiment of a gas valve having two outlet ports, according to an exemplary embodiment.

Ordinarily and as discussed in the background section, the use of a smaller mesh size would lead to an undesirable pressure drop in the outlet. However, in the presently disclosed gas valve 10, the pressure drop is avoided using the second retainer ring 66 and by the dual screen construction. FIG. 4 depicts the second retainer ring 66, including the plurality of ribs 72 extending from the ring body 67, in greater detail. In an embodiment, the second retainer ring 66 includes from two to six ribs 72. In the embodiments depicted in FIG. 4, the second retainer ring 66 includes three ribs 72. Further, in embodiments, the plurality of ribs 72 are equidistantly spaced around the perimeter of the second retainer ring 66. The plurality of ribs 72 decrease the surface area of the second mesh 31 in contact with the second retainer ring 66 by creating a gap 74 between the ring body 67 and the second screen 31 (as shown in FIG. 3), thereby increasing the fluid flow area and helping to avoid an undesirable pressure drop.

Further, the dual screen construction also helps to prevent either screen 30, 31 from becoming over clogged. That is, a single screen of a small mesh size would become clogged with large and small debris. By using two different screen sizes, the smaller debris can pass through the second screen 31 while still being caught by the first screen 30. Further, the larger sized second screen 31 catches the large debris, while allowing the smaller debris to pass through. In this way, no single screen is blocked by all the debris. Conventionally, a single screen was used, and a tradeoff between blocking a portion of debris and allowing some debris to lodge in the valve plug was made so that a desirable pressure drop could be maintained.

Advantageously, the use of two differently-sized screens 28, 30 along with the second retainer ring 66 maintains the desired pressure drop across the gas valve 10 while also preventing debris from reaching the valve plug 22. In embodiments, the pressure drop across the fittings 32, 34 is no more than 10%.

In embodiments, the gas valve 10 may include more than one outlet 18 such as shown in FIG. 4. In such embodiments, both outlets 18 may include the first and second screens 30, 31 held in place with respective retainer rings 56, 66 as described above. Both outlets 18 are in fluid communication with the interior chamber 20, and both outlets 18 are provided with respective valve plugs 22 attached to lever arms 24. Further, flow through each outlet 18 is controlled by respective heater wires 28 wrapped around bimetallic levers 27. The heater wires 28 can be individually controlled via electrical leads 29 that receive signals from a controller (e.g., a single controller may provide signals to actuate each lever arm 24 individually). Further, while the outlets 18 shown in FIGS. 1-4 are arranged on opposite sides of the gas valve 10 (i.e., on the cover 14 and on the bottom of the housing 12 in FIG. 4), one or both of the outlets 18 could instead be arranged on a side of the housing 12 instead.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve, comprising:
   a housing comprising an inlet, an outlet, and an interior chamber in fluid communication with the inlet and the outlet;
   a seat fitting comprising a first screen held in place by a first retainer ring, wherein the seat fitting includes a valve seat;
   an outlet fitting comprising a second screen held in place by a second retainer ring, the second retainer ring including a plurality of ribs extending from a ring body, wherein the plurality of ribs create a gap between the ring body and the second screen; and
   a valve plug configured to selectively engage the valve seat to open and close a passage between the interior chamber and the outlet;
   wherein the seat fitting is contained at least partially within the outlet fitting to define the outlet of the housing.

2. The valve of claim 1, wherein the first screen comprises a first mesh size and the second screen comprises a second mesh size and wherein the first mesh size is smaller than the second mesh size.

3. The valve of claim 2, wherein the first mesh size is from 80×80 to 100×100.

4. The valve of claim 3, wherein the second mesh size is from 80×80 to 100×100.

5. The valve of claim 1, wherein, when gas flows between the inlet and outlet, a pressure drop across the outlet is no more than 10%.

6. The valve of claim 1, wherein the first retainer ring is welded to the seat fitting.

7. The valve of claim 6, wherein the second retainer ring is welded to the outlet fitting.

8. The valve of claim 7, wherein at least one of the first retainer ring or second retainer ring is spin-welded to the seat fitting or to the outlet fitting, respectively.

9. The valve of claim 1, wherein the plurality of ribs is from two to six ribs.

10. The valve of claim 1, wherein the gap between the ring body and the second screen is at least 0.035 inches.

11. The valve of claim 1, wherein the ring body comprises a first end and a second end and a tapered outer surface, the ring body decreasing in diameter going from the first end to the second end.

12. The valve of claim 1, wherein the valve plug is carried on a lever arm, wherein the lever arm comprises a section of a bimetallic lever wrapped in a heater wire, and wherein, when current runs through the heater wire, the bimetallic lever causes the lever arm to pull the valve plug away from the valve seat.

13. The valve of claim 1, comprising a further outlet in fluid communication with the interior chamber, wherein the further outlet is defined by a further seat fitting contained at least partially in a further outlet fitting;
   wherein the further seat fitting comprises a third screen held in place by a third retainer ring, wherein the further seat fitting includes a further valve seat;
   the further outlet fitting comprising a fourth screen held in place by a fourth retainer ring, the fourth retainer ring including a plurality of ribs extending from a ring body, wherein the plurality of ribs create a gap between the ring body and the fourth screen; and
   a further valve plug configured to selectively engage the further valve seat to open and close a passage between the interior chamber and the further outlet.

14. The valve of claim 13, wherein the outlet and the further outlet are arranged on opposite sides of the housing.

15. An outlet port for a gas valve, comprising:
   a seat fitting including a first screen held in place by a first retainer ring, wherein the seat fitting includes a valve seat configured to engage a valve plug;
   an outlet fitting including a second screen held in place by a second retainer ring, the second retainer ring including a plurality of ribs extending from a ring body, wherein the plurality of ribs create a gap between the ring body and the second screen; and
   wherein the seat fitting is contained at least partially within and is coaxial with the outlet fitting.

16. The outlet port of claim 15, wherein the first screen has a first mesh size, the second screen has a second mesh size, and the first mesh size is smaller than the second mesh size.

17. The outlet port of claim 16, wherein the first mesh size is from 80×80 to 100×100.

18. The outlet port of claim 17, wherein the second mesh size is from 80×80 to 100×100.

19. The outlet port of claim 15, wherein the first retainer ring is spin-welded to the seat fitting and wherein the second retainer ring is spin-welded to the outlet fitting.

20. The outlet port of claim 15, wherein the gap between the ring body and the second screen is at least 0.035 inches.

21. The outlet port of claim 20, wherein the plurality of ribs is from two to six ribs.

* * * * *

UNITED STATES PATENT AND TRADEMARK OFFICE
CERTIFICATE OF CORRECTION

PATENT NO. : 11,421,789 B2
APPLICATION NO. : 16/704956
DATED : August 23, 2022
INVENTOR(S) : Rodgers et al.

It is certified that error appears in the above-identified patent and that said Letters Patent is hereby corrected as shown below:

In the Claims

Claim 15, Line 11 reads "within and is coaxial with the outlet fitting." and should read --within the outlet fitting.--

Signed and Sealed this
Eleventh Day of October, 2022

Katherine Kelly Vidal
*Director of the United States Patent and Trademark Office*